(12) United States Patent
Ferguson et al.

(10) Patent No.: US 7,587,662 B2
(45) Date of Patent: Sep. 8, 2009

(54) DETECTION OF NOISE WITHIN AN OPERATING FREQUENCY ON A NETWORK

(75) Inventors: Anthony D. Ferguson, Watertown, MN (US); Stephen A. Zielinski, Savage, MN (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 175 days.

(21) Appl. No.: 11/238,655

(22) Filed: Sep. 29, 2005

(65) Prior Publication Data
US 2007/0074085 A1    Mar. 29, 2007

(51) Int. Cl.
*G06F 7/02* (2006.01)
(52) U.S. Cl. .............. 714/819; 714/758; 714/807; 714/776; 714/704; 714/25
(58) Field of Classification Search .......... 714/25, 714/48, 700, 704, 776, 775, 807, 819
See application file for complete search history.

(56) References Cited

U.S. PATENT DOCUMENTS

| | | | | |
|---|---|---|---|---|
| 4,792,953 A | * | 12/1988 | Pasdera et al. ............ 714/747 |
| 5,390,188 A | * | 2/1995 | Dawson ................... 714/717 |
| 5,444,695 A | * | 8/1995 | Copley et al. ............ 370/452 |
| 5,801,948 A | * | 9/1998 | Wood et al. .............. 700/108 |
| 6,023,779 A | * | 2/2000 | Fullam et al. ............ 714/751 |
| 6,035,425 A | * | 3/2000 | Caldwell et al. ........... 714/52 |
| 6,914,948 B2 | * | 7/2005 | Kuki et al. ............... 375/341 |
| 7,082,117 B2 | * | 7/2006 | Billhartz ................. 370/338 |
| 7,210,353 B2 | * | 5/2007 | Braun et al. ............... 73/585 |
| 2006/0083324 A1 | * | 4/2006 | DesJardins et al. ........ 375/260 |
| 2006/0107184 A1 | * | 5/2006 | Kim ........................ 714/760 |
| 2006/0277444 A1 | * | 12/2006 | Holian et al. .............. 714/41 |

OTHER PUBLICATIONS

Product Specification, Foundation™ Fieldbus from Relcom Inc.

* cited by examiner

*Primary Examiner*—Esaw T Abraham
(74) *Attorney, Agent, or Firm*—Kinney & Lange, P.A.

(57) ABSTRACT

Noise is detected within an operating frequency of a communication medium. Messages are monitored on the communication medium for corrupted messages. A noise detected signal is generated when a number of corrupted messages detected reaches a corrupted message threshold.

12 Claims, 4 Drawing Sheets

DETECTION OF NOISE WITHIN AN OPERATING FREQUENCY ON A NETWORK

BACKGROUND OF THE INVENTION

The present invention relates to a network and signals on the network. In particular, the present invention relates to detecting noise within an operating frequency of a communication network.

In a typical industrial plant, a distributed control system (DCS) is used to control many of the industrial processes performed at the plant. Typically, the plant has a centralized control room having a computer system with user input/output (I/O), disc I/O, and other peripherals as are known in the computing art. Coupled to the computing system are a controller and a process I/O subsystem.

The process I/O subsystem includes I/O ports which are connected to various field devices throughout the plant. Field devices include various types of analytical equipment, silicon pressure sensors, capacitive pressure sensors, resistive temperature detectors, thermocouples, strain gauges, limit switches, on/off switches, flow transmitters, pressure transmitters, capacitance level switches, weigh scales, transducers, valve positioners, valve controllers, actuators, solenoids, and indicator lights. The term "field device" encompasses these devices, as well as any other device that performs a function in a distributed control system.

Fieldbus is a multi-drop serial digital two-way communications protocol intended for connecting field instruments and other process devices such as monitoring and simulation units in distributed control systems. Fieldbus allows enhanced digital communication over previous process control loop methods while maintaining the ability to power process devices coupled to the Fieldbus loop and while meeting intrinsic safety requirements.

Two reasonably standardized industrial Fieldbus protocols are Foundation Fieldbus and Profibus. The physical layer of the Fieldbus protocols are defined by Instrument Society of America (ISA) standard ANSI/ISA-50.02-1992, and its draft two extension dated 1995. The Fieldbus protocol defines two subprotocols. An H1 Fieldbus network transmits data at a rate up to 31.25 kilobits per second (Kbps) and provides power to field devices coupled to the network. The H1 physical layer subprotocol is defined in Clause 11 of Part 2 of the ISA standard, approved in September 1992. An H2 Fieldbus network transmits data at a rate up to 2.5 megabits per second (Mbps), does not provide power to field devices connected to the network, and is provided with redundant transmission media.

Fieldbus networks are often used in association with large motors, process equipment and factory equipment. Sometimes, the start-up of a motor or equipment causes a burst of noise within the operating frequency of the communication medium. This burst of noise may cause corrupted messages and, in extreme cases, may result in a loss of communication with the network device.

BRIEF SUMMARY OF THE INVENTION

The present invention is directed to detecting noise within an operating frequency of a communication medium. Messages are monitored on the communication medium for corrupted messages. When the number of corrupted messages reaches a corrupted message threshold, a noise detected signal is generated.

DETAILED DESCRIPTION

Process Control System Overview

The Fieldbus physical layer defines the electrical characteristics of the physical means of transmission and reception of the communications protocol data in the form of a Physical Layer Protocol Data Unit (PhPDU). In addition, the Fieldbus physical layer specifies the symbol encoding, message framing, and error detection method. The ISA Fieldbus standard defines three signaling speeds and two modes of coupling. For purposes of this description, a process control system will be described in the context of the H1 physical layer defined in Clause 11 of ISA standard ANSI/ISA-50.02, Part 2-1992. That clause covers a 31.25 Kbps, voltage mode, wire medium, with a low-power option. This option allows for a device connected to the communications medium to receive its operational power from the communications medium. The physical layer can be capable of meeting the intrinsic safety requirements for hazardous environments. The protocol operates on low-grade twisted pair cable and supports multiple devices, in accordance with the voltage and current limitations which are defined by the standard.

Figure 1:
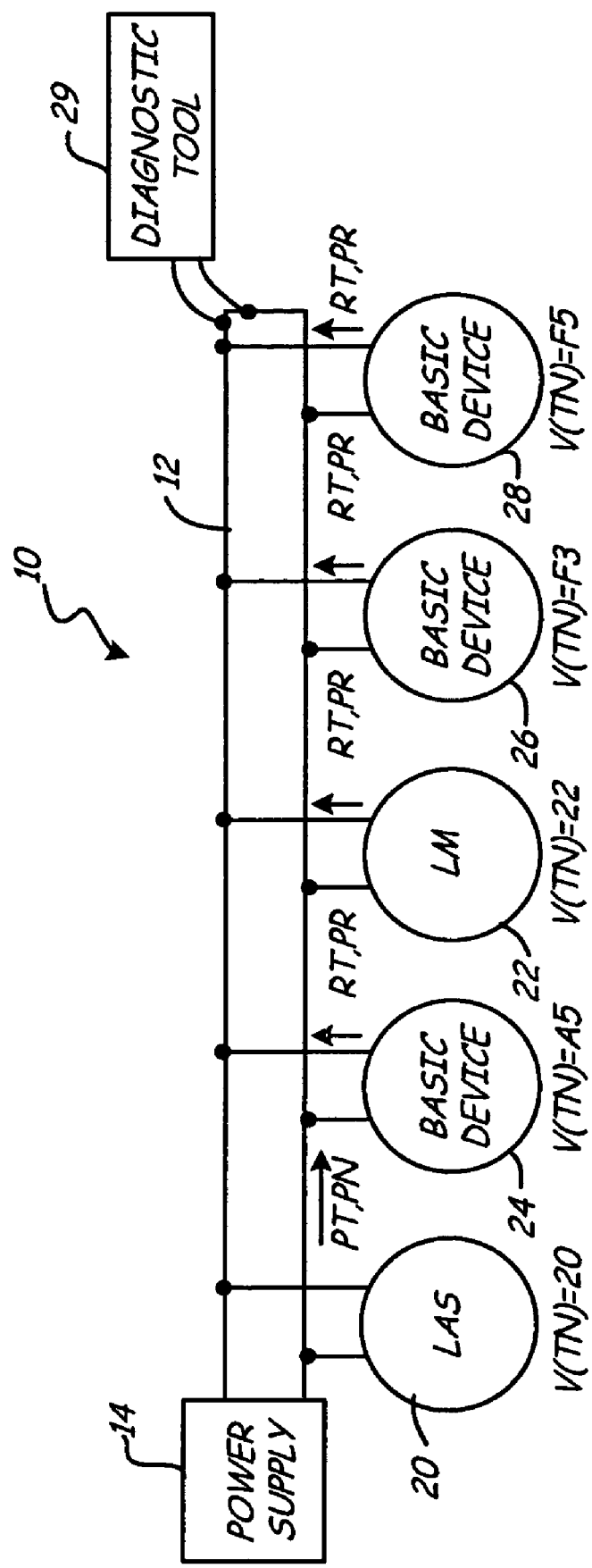
FIG. 1 is a diagram of a process control system with digital communication between devices over a communication medium segment and an attached diagnostic tool.

FIG. 1 shows a typical process control system 10 including segment 12, power supply 14, and five devices: Link Active Scheduler (LAS) 20, Link Master (LM) device 22, and basic devices 24, 26, and 28. FIG. 1 also shows diagnostic tool 29 attached to segment 12. Segment 12 can support up to thirty-two devices on a single pair of wires. Typically, segment 12 will have from four to sixteen devices, based on loop execution speed, power, and intrinsic safety requirements.

LAS 20 maintains a central schedule for all the communication between devices on segment 12. LAS 20 improves the overall communication reliability by sending Compel Data (CD) Data Link Protocol Data Units (DLPDUs) to each device to transmit back cyclic data which is then scheduled to do so. LAS 20 serves as the local source of Data Link time (DL-time) on segment 12. A DLPDU is the data content of the PhPDU message that is communicated across segment 12.

LM device 22 is configured to take over the responsibilities of LAS 20 should LAS 20 fail or become inoperable. Although only LM device 22 is shown in FIG. 1, more than one Link Master device can be present on a segment. This allows for the case if both the Link Active Scheduler and the first Link Master were to fail, then the second Link Master can take over for the Link Active Scheduler. Once the Link Active Scheduler is disabled, the Link Master takes over the functionality of the Link Active Scheduler.

Each device has a unique address called the V(TN), which represents the local node-ID(This_Node). In the example shown in FIG. 1, LAS 20 has an address V(TN)=20; LM device 22 has address V(TN)=22; basic device 24 has address V(TN)=A5; basic device 26 has address V(TN)=F3; and basic device 28 has address V(TN)=F5.

LAS 20 sends Pass Token (PT) and Probe Node (PN) messages to all devices on segment 12. Each of the other devices (LM device 22 and basic devices 24, 26, 28) send Return Token (RT) and Probe Response (PR) messages back to LAS 20, as appropriate.

Each basic device 24, 26, 28 only needs to see its own PT and PN messages that are sent by LAS 20. PT and PN messages have a designation address (DA) encoded in the second byte of the DLPDU. LAS 20 passes a token (PT) or probes a node (PN) one at a time to all devices on segment 12.

Once basic device 24, 26, or 28 receives a PT message with a designation address equal to that device's unique address (DA=V(TN)), it then will respond back to LAS 20 with an RT message. If basic device 24, 26, or 28 receives a PN DLPDU with DA=V(TN), it is required to respond back with a PR message.

The transmission of PT and PN messages from LAS 20 and RT and PR messages to LAS 20 creates several messages on segment 12 that a particular basic device 24, 26, 28 does not need to receive and take action on. Each basic device 24, 26, 28 only needs to respond to PT and PN messages addressed to that particular device. Constantly getting interrupted by PT and PN messages from LAS 20 that are addressed to other devices, as well as RT and PR messages from other devices addressed to LAS 20, can create undue processing time to handle these "nuisance interrupts." With basic devices 24, 26, and 28, DLPDU filtering can be used to reduce the number of interrupts that the basic device has to process. On the other hand, LAS 20 must process every message on segment 12.

All devices on segment 12 transmit data onto segment 12 as a Manchester encoded baseband signal. With Manchester encoding, "0" and "1" are represented by transitions that occur from low-to-high and high-to-low, respectively, in the middle of the bit period. For Fieldbus, the nominal bit time is 32 microseconds (μsec), with the transition occurring at 16 μsec. The Manchester encoding rules have been extended to include two additional symbols, non-data plus (N+) and non-data minus (N−), wherein no transition occurs during the bit period and the Manchester encoded baseband signal remains high (N+) or low (N−).

Diagnostic tool 29 is attached to segment 12 by two conductive elements, such as wires or probes. One of the diagnostic capabilities of diagnostic tool 29 is to alert the user when a number of corrupted messages on segment 12 exceeds a corrupted message threshold. As will be described in more detail with regard to FIG. 4, exceeding the corrupted message threshold may be indicative of noise within the operating frequency.

Message Format

Figure 2:
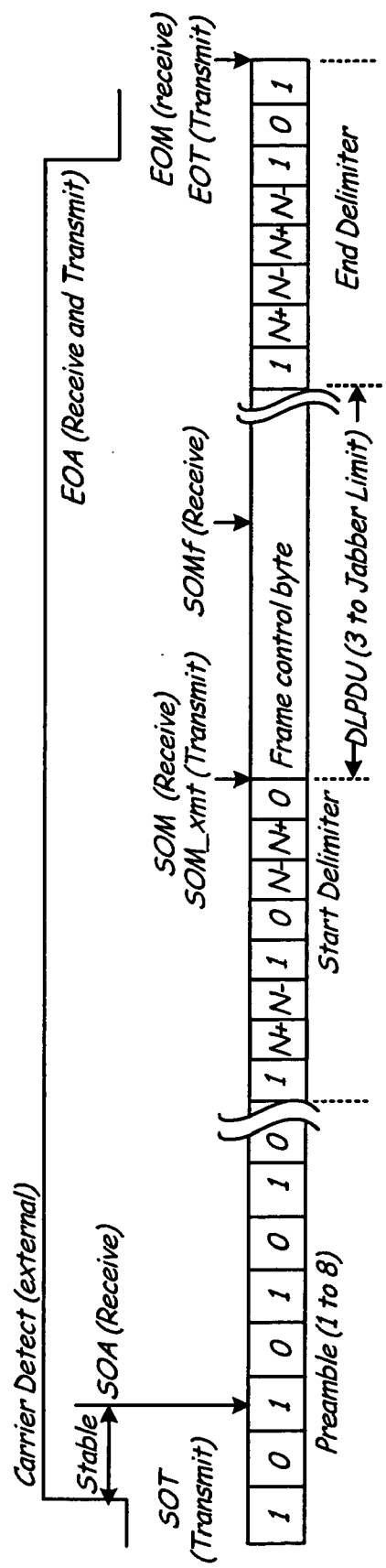
FIG. 2 shows a message format for communications between devices of the process control system of FIG. 1.

FIG. 2 shows the format of a Physical Layer Protocol Data Unit (PhPDU) used to transmit messages over segment 12. The PhPDU includes a preamble, a Start Delimiter (SD), a Data Link Protocol Data Unit (DLPDU), and an End Delimiter (ED). The preamble is the first several bits of the PhPDU message. The fieldbus specification allows for one to eight bytes of preamble. The device receiving the message uses the preamble to synchronize with the incoming message. As shown in FIG. 2, the sequence of the first byte of the preamble is 1 0 1 0 1 0 1 0.

The Start Delimiter (SD) immediately follows the preamble. There is one SD per message. The fieldbus specification requires that the SD have non-character data (N+ and N−), which always appear in the SD message in complementary pairs. This encoding scheme makes the SD unique and impossible to confuse with the data portion (DLPDU) of the message. The sequence shown in FIG. 2 for the SD is 1 N+ N− 1 0 N− N+ 0.

The DLPDU is a variable length message. It contains a Frame Control (FC) byte as its first byte and a Frame Check Sequence (FCS) checksum as its final two bytes (described in more detail below). The length of DLPDU is variable, with a minimum of three bytes (in the case of an RT message) up to a jabber limit of, for example, about 300 bytes.

The End Delimiter (ED) follows the DLPDU. It represents the last byte of any PhPDU message transmitted over segment 12. Similar to the SD, the ED includes non-character data in complementary pairs. This encoding scheme makes the ED unique and impossible to confuse with the DLPDU. The sequence shown in FIG. 2 for the End Delimiter is 1 N+ N− N+ N− 1 0 1.

FIG. 2 also shows a Carrier Detect signal. The purpose of the Carrier Detect signal is to indicate when (a) an incoming PhPDU message is present on segment 12 or (b) a device is transmitting a message onto segment 12.

Start of Transmit (SOT) occurs at the moment that a Transmit Enable (TxE) goes active, i.e., when the preamble of a PhPDU message is first presented to segment 12.

Start of Activity (SOA) occurs after the Carrier Detect signal goes active and has been stable for at least one bit time or two bit times (approximately 16 to 32 μsec). This time depends on when the Carrier Detect goes active with respect to the internal clock of the device receiving the message. This allows the communication controller of the device to ignore noise glitches that are most apt to occur at the front end of the preamble. Additional time is used to synchronize with the bit boundaries to eliminate the potential for short noise bursts on segment 12 being misinterpreted as activity. For a transmitted message, SOA occurs once the Transmit Enable goes active (i.e., the preamble of the PhPDU is presented to segment 12).

Start of Message (SOM) occurs at the beginning of the first bit when the FC byte is detected for a received message.

SOM_xmt is the Start of Message Transmit, which occurs at the beginning of the first bit when the FC byte is detected for a transmitted message.

SOMf is an SOM of a received filtered DLPDU. This occurs when the communication controller within the device has detected enough information to make the determination that the incoming message is to be filtered.

End of Message (EOM) occurs at the end of the last bit of the ED being encountered in a received message. End of Transmission (EOT) occurs at the end of the last bit of the ED in a transmitted message.

End of Activity (EOA) occurs when the Carrier Detect has gone inactive. The EOA occurs for both transmitted and received DLPDUs.

Diagnostic Tool 29

Figure 3:
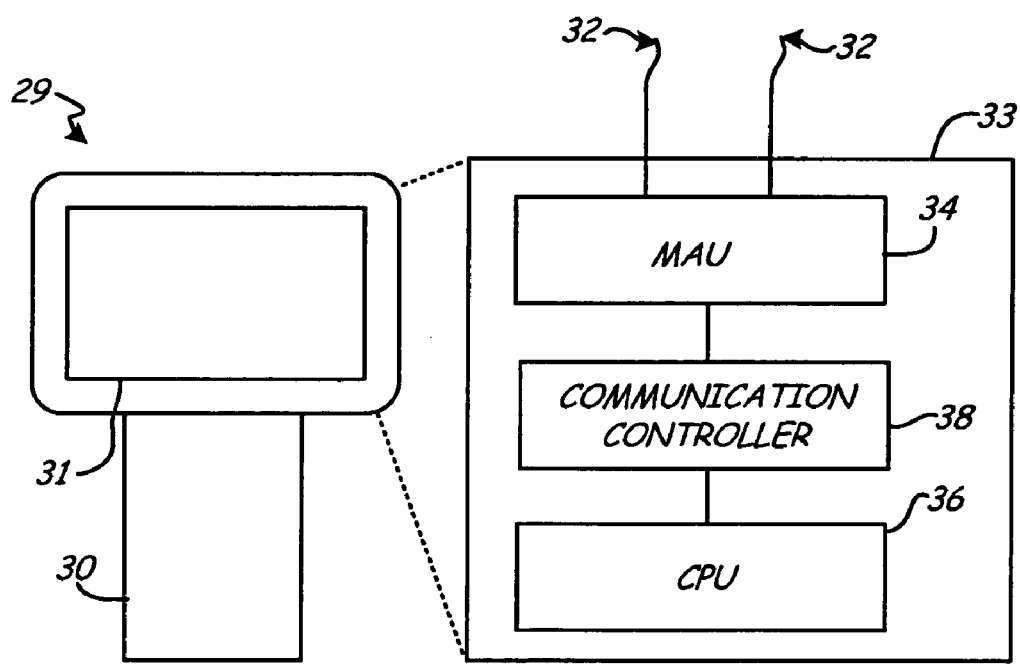
FIG. 3 is a block diagram of the architecture of the diagnostic tool shown in FIG. 1.

FIG. 3 is a block diagram of the architecture of diagnostic tool 29. Diagnostic tool 29 includes housing 30, liquid crystal display (LCD) 31, conductive elements 32, and communications board 33. Communications board 33 is contained in housing 30 and includes medium attachment unit (MAU) 34, central processing unit (CPU) 36, and communication controller 38.

Housing 30 has a size to facilitate ease of portability of diagnostic tool 29. For example, housing 30 may be sized such that diagnostic tool 29 is a handheld device.

LCD 31 is contained in housing 30 such that the display is viewable externally by a user of diagnostic tool 29. LCD 31 is used to transmit information to the user relating to operation of diagnostic tool 29.

Diagnostic tool 29 is electrically attached to segment 12 by conductive elements 32. In one embodiment, conductive elements 32 are conductive wires or probes. Conductive elements 32 provide signals from segment 12 to MAU 34. MAU 34 is a transceiver that converts signals from segment 12 so that the signals are usable by the hardware on communications board 33. MAU 34 is a part of the physical layer of the network protocol, and may be an integrated circuit or composed of discrete components.

CPU 36 is connected to MAU 34 via communication controller 38. CPU 36 is a microprocessor-based system such as Motorola 68LC302, Motorola Mcore 2075, Motorola PowerPC 850, Atmel Thumb processor AT91M40800 and others. In one embodiment, CPU 36 is an 8-bit or higher processor.

Communication controller 38 is an application specific integrated circuit (ASIC) chip that serves as an interface between MAU 34 and CPU 36. It transmits and receives encoded Manchester data to and from external analog circuitry connected to segment 12. After receiving the serial data from MAU 34, communication controller 38 decodes the data, forms the data into bytes, strips off the preamble, SD, and ED (and, optionally, the FCS bytes), and provides the message data for the link layer to read.

Figure 4:
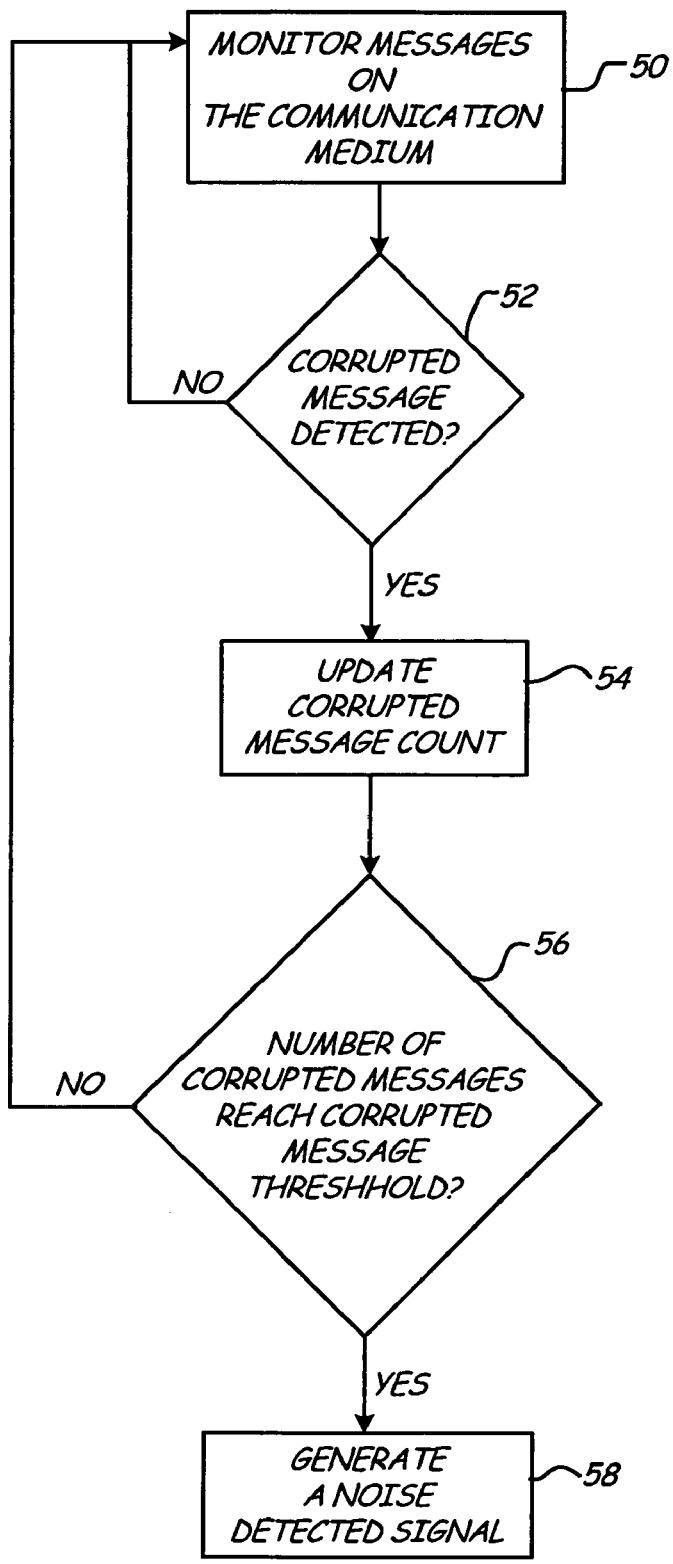
FIG. 4 is a flow diagram of a process for detecting noise within the operating frequency on a network according to the present invention.

One of the capabilities of diagnostic tool 29 is to detect the presence of noise within the operating frequency on segment 12. FIG. 4 is a flow diagram of the process used by diagnostic tool 29 for detecting noise within the operating frequency of segment 12 according to an embodiment of the present invention. This process may be implemented in software run by CPU 36 or in hardware in diagnostic tool 29. In general, diagnostic tool 29 tracks corrupted messages detected on segment 12 and generates a noise detected signal if the number of corrupted messages detected exceeds a corrupted message threshold.

Diagnostic tool 29 monitors messages on segment 12 (step 50) for indications of a corrupt message. In one embodiment, communication controller 38 monitors messages on segment 12 by performing a FCS check on all messages transmitted onto segment 12. The FCS check is a cyclical redundancy check (CRC), which is a type of hash function used to produce a checksum to detect errors in transmission of the message. The result of the FCS check is stored in the final two bytes of a DLPDU. Whenever a device on segment 12 transmits a message, such as PT and PN messages from LAS 20 or RT and PR messages from the basic devices 24, 26, and 28, the device appends the results of the FCS check to the end of the message before transmission onto segment 12. When diagnostic tool 29 detects the message on segment 12, communication controller 38 performs an identical FCS check on the message. Communication controller 38 compares the result of the FCS check with the FCS bytes at the end of the DLPDU. If the two FCS results do not match, the message may have been corrupted during transmission (step 52), and communication controller 38 sets a status bit in an error register to indicate that the message is corrupt.

After performing the FCS check on the message, communication controller 38 processes the remainder of the message and generates an interrupt upon detection of an EOA. Since the EOA represents the final processing of a received message, waiting to generate an interrupt until this point allows both the device that is the intended recipient of the message and diagnostic tool 29 to completely process the message.

When the EOA interrupt is generated, a corrupted message count stored in a register in communication controller 38 is updated (step 54). In one embodiment, the corrupted message count is related to the total number of corrupted messages processed by communication controller 38. In another embodiment, the corrupted message count is related to the number of corrupted messages processed by communication controller 38 within a period of time.

CPU 36 maintains a data field in software called a corrupted message threshold. The corrupted message threshold is the point at which it can be inferred that noise within the operating frequency of segment 12 is likely the cause of corrupted messages. For example, the corrupted message threshold may be related to a number of corrupted messages over a period of time (e.g., one corrupted message every 30 seconds) or a number of corrupted messages out of a total number of messages on segment 12 (e.g., one corrupted message out of every 50 messages on segment 12). CPU 36 requests the value of the corrupted message count from communication controller 38 either periodically to perform a diagnostic analysis on segment 12 or in response to certain conditions detected by CPU 36 on segment 12.

CPU 36 periodically requests the value of the corrupted message count from communication controller 38 to determine whether an unusual number of corrupted messages are occurring on segment 12. CPU 36 compares the corrupted message count with the corrupted message threshold to determine if the threshold has been reached (step 56). CPU 36 may also assign a diagnostic status to segment 12 based upon this comparison. For example, if no corrupted messages are detected (i.e., the corrupted message count is zero), then the status of segment 12 is good. If the corrupted message count is less than the corrupted message threshold, then the status of segment 12 is questionable since messages are being corrupted on segment 12, but the number of messages being corrupted is not indicative of noise occurring on segment 12. If the corrupted message count is equal to or greater than the corrupted message threshold, the status of segment 12 is poor since the number of messages being corrupted indicates that noise in the operating frequency of segment 12 may be the cause of the corrupted messages.

CPU 36 also requests the corrupted message count from communication controller 38 in response to certain conditions detected on segment 12 by CPU 36. For example, when a device is removed from a list of actively communicating devices maintained by CPU 36, this indicates a loss of communication with the device. Also, if CPU 36 detects a stale data block (i.e., a period of time where data does not change after multiple executions), this is indicative of a problem on segment 12. In both cases, communication controller 38 requests the corrupted message count to diagnose the cause of the problem on segment 12. CPU 36 compares the corrupted message count with the corrupted message threshold to determine if the threshold has been reached (step 56). When the number of corrupted messages reaches the corrupted message threshold, noise within the operating frequency of segment 12 may be the cause of the loss of communication with the device or the stale data.

In addition, if the number of corrupted messages detected in a period of time is greater than the number of messages a single device can send in this period of time, this may indicate that a condition on segment 12 is causing messages to and from multiple devices to be corrupted. From this indication, it may be inferred that noise within the operating frequency of segment 12 is corrupting the messages. This eliminates the possibility of another cause of corrupted messages, such as corrupted messages being sent by a defective device.

If the corrupted message threshold is exceeded, CPU 36 generates a noise detected signal (step 58). In one embodiment, the noise detected signal is a signal to LCD 31 to produce visual output that alerts the user to the existence of messages corrupted by noise within the operating frequency of the network. In another embodiment, diagnostic tool 29 emits an audible alarm to alert the user to the existence of messages corrupted by noise within the operating frequency of the network.

In summary, messages on a communication medium are sometimes corrupted due to noise within the operating frequency of a network. The present invention is a method for detecting noise within an operating frequency of a communication medium. Corrupted messages are detected as the messages are received from the communication medium. A noise detected signal is generated when a number of corrupted messages detected reaches a corrupted message threshold.

Although the present invention has been described with reference to preferred embodiments, workers skilled in the art will recognize that changes may be made in form and detail without departing from the spirit and scope of the invention.

The invention claimed is:

1. A method for detecting noise within an operating frequency of a communication medium, the method comprising:
   monitoring messages on the communication medium;
   detecting corrupt message count when a corrupt message is detected;
   updating a corrupted message count when a corrupt message is detected;
   detecting loss of communication with a device connected to the communication medium;
   detecting a block of stale data;
   comparing the corrupted message count with a corrupted message threshold (a) when loss of communication with a device is detected, or (b) when a block of stale data is detected;
   generating a noise detected signal when the corrupted message count has reached the corrupted message threshold; and
   generating an audible or visual output in response to the noise detected signal.

2. The method of claim 1, wherein the corrupted message threshold is related to a number of corrupted messages detected over a period of time.

3. The method of claim 1, wherein the corrupted message threshold is a ratio of the number of corrupted messages detected to all messages on the communication medium.

4. A diagnostic tool for connecting to a communication medium, the diagnostic tool comprising:
   a medium attachment unit (MAU) connected to the communication medium to receive signals from the communication medium;
   a communication controller connected to the MAU which is operable to detect corrupted messages on the communication medium and update a corrupted message count when a corrupted message is detected;
   a processor connected to the communication controller which is operable to generate a noise detected signal when the corrupted message count has reached a corrupted message threshold, wherein the processor (a) requests a value of the corrupted message count when the processor detects a loss of communication with a device connected to the communication medium, or (b) requests a value of the corrupted message count when the processor detects a block of stale data.

5. The diagnostic tool of claim 4, wherein the corrupted message threshold is related to the number of corrupted messages over a period of time.

6. The diagnostic tool of claim 4, wherein the corrupted message threshold is a ratio of the number of corrupted message signals generated to all messages on the communication medium.

7. The diagnostic tool of claim 4, wherein the corrupted message threshold is provided in software executed by the processor.

8. The diagnostic tool of claim 4, wherein the corrupted message count is stored in a register in the communication controller.

9. A method for detecting noise within an operating frequency of a communication medium, the method comprising:
   detecting a corrupted message on the communication medium;
   updating a corrupted message count when a corrupted message is detected;
   detecting loss of communication with a device connected to the communication medium;
   detecting a block of stale data;
   requesting the corrupted message count (a) when loss of communication with a device is detected, or (b) when a block of stale data is detected;
   generating a noise detected signal if the corrupted message count has reached a corrupted message threshold; and
   generating an audible or visual output in response to the noise detected signal.

10. The method of claim 9, wherein the corrupted message threshold is related to the number of corrupted messages detected over a period of time.

11. The method of claim 9, wherein the corrupted message threshold is a ratio of the number of corrupted message signals generated to all messages on the communication medium.

12. The method of claim 9, wherein detecting a corrupted message on the communication medium comprises performing a check of the frame check sequence (FCS) checksum on a message to determine whether it is corrupted.

* * * * *